US012806102B2

(12) United States Patent
Dung

(10) Patent No.: US 12,806,102 B2
(45) Date of Patent: Nov. 24, 2026

(54) CHANGEABLE CARRYING DEVICE FOR HUMAN BODY BASED ON POSTURE CHANGING

(71) Applicant: Ming Dung, Taichung City (TW)

(72) Inventor: Chen-Yuan Dung, Taichung City (TW)

(73) Assignee: Ming Dung, Taichung City (TW)

( * ) Notice: Subject to any disclaimer, the term of this patent is extended or adjusted under 35 U.S.C. 154(b) by 1121 days.

(21) Appl. No.: 17/900,221

(22) Filed: Aug. 31, 2022

(65) Prior Publication Data

US 2023/0074466 A1 Mar. 9, 2023

(30) Foreign Application Priority Data

Sep. 1, 2021 (TW) ................................ 110132484

(51) Int. Cl.

| | |
|---|---|
| ***A61G 5/14*** | (2006.01) |
| ***A61G 7/005*** | (2006.01) |
| ***A61G 7/015*** | (2006.01) |
| ***A61G 7/16*** | (2006.01) |

(52) U.S. Cl.
CPC ............... *A61G 7/16* (2013.01); *A61G 7/005* (2013.01); *A61G 7/015* (2013.01)

(58) Field of Classification Search
CPC .......... A61G 1/017; A61G 7/005; A61G 7/16; A61G 7/165; A61G 5/14; A61G 2200/36
See application file for complete search history.

(56) References Cited

U.S. PATENT DOCUMENTS

| | | | | | |
|---|---|---|---|---|---|
| 4,099,277 | A * | 7/1978 | Watkins | A61G 7/005 | 280/250.1 |
| 5,265,689 | A * | 11/1993 | Kauffmann | A61G 5/1051 | 297/DIG. 10 |
| 5,346,280 | A * | 9/1994 | Deumite | A61G 5/14 | 297/DIG. 10 |
| 5,454,126 | A * | 10/1995 | Foster | A61G 7/00 | 5/624 |
| 5,715,548 | A * | 2/1998 | Weismiller | A61G 7/052 | 5/624 |
| 6,125,957 | A * | 10/2000 | Kauffmann | B60L 50/52 | 297/DIG. 10 |
| 6,505,365 | B1 * | 1/2003 | Hanson | A61G 7/053 | 5/613 |
| 6,862,762 | B1 * | 3/2005 | Johnson | A61G 7/015 | 5/601 |
| 10,813,804 | B1 * | 10/2020 | Tu | A61G 7/018 | |
| 11,813,212 | B2 * | 11/2023 | Hamilton | A61G 5/128 | |

(Continued)

*Primary Examiner* — Matthew Troutman
*Assistant Examiner* — Ifeolu A Adeboyejo
(74) *Attorney, Agent, or Firm* — MUNCY, GEISSLER, OLDS & LOWE, P.C.

(57) ABSTRACT

The present invention discloses a changeable carrying device for human body based on posture changing which includes a base frame, a moving assembly, a first driving assembly and a carrying assembly for carrying a human body. The base frame has a sliding member capable of moving straight. The moving assembly is pivotally connected with the sliding member. The moving assembly includes a first rod and a crank with an end pivotally connected with the first rod and with an opposite end pivotally connected with the base frame. The first driving assembly drives the moving assembly to rotate relative to the base frame and to move together with the first sliding member.

8 Claims, 21 Drawing Sheets

(56) References Cited

U.S. PATENT DOCUMENTS

| | | | | |
|---|---|---|---|---|
| 2002/0101102 | A1* | 8/2002 | Chang | A61G 5/14 297/330 |
| 2005/0046129 | A1* | 3/2005 | Antonishak | A61G 5/043 280/47.4 |
| 2006/0253983 | A1* | 11/2006 | Falabrino | A61G 7/16 5/618 |
| 2006/0260051 | A1* | 11/2006 | Paz | A61G 7/053 5/618 |
| 2011/0143898 | A1* | 6/2011 | Trees | A63B 21/1672 482/142 |
| 2014/0157515 | A1* | 6/2014 | Manson | A61G 7/16 5/13 |
| 2017/0347806 | A1* | 12/2017 | Shih | A47C 20/041 |
| 2018/0055231 | A1* | 3/2018 | Hamid | A47C 4/04 |
| 2020/0100961 | A1* | 4/2020 | Zeng | A61G 7/018 |
| 2022/0117811 | A1* | 4/2022 | Zeng | A61G 7/053 |
| 2024/0350338 | A1* | 10/2024 | Martínez Contreras | A61G 7/002 |

* cited by examiner

CHANGEABLE CARRYING DEVICE FOR HUMAN BODY BASED ON POSTURE CHANGING

BACKGROUND OF INVENTION

Field of Invention

The present invention relates to a carrying device for human body.

Related Prior Art

For people with disabilities such as patients suffering from illness or injury, or elderly people suffering from degenerative conditions associated with aging requires caregiver's assistance in order to lie down or get up from the bed, as well as sitting and standing. Therefore, it would be desirable to provide an apparatus to help people with disabilities to switch position in order to make their life more convenient and to alleviate the burden of the caregivers.

SUMMARY OF THE INVENTION

In view of the aforementioned problem, the present invention provides a changeable carrying device for human body based on posture changing. It could effectively assist people with disabilities to switch position in order to make their life more convenient and to reduce the assistance of the caregivers, or with no assistance at all.

In particular, the present invention provides a changeable carrying device for human body comprises a base frame, a moving assembly, a first driving assembly and a carrying assembly. The base frame has at least one first sliding member capable of moving straight, the moving assembly is pivotally connected with the first sliding member of the base frame. The moving assembly has a first rod and at least a crank, the crank has an end pivotally connected with the first rod and with an opposite end pivotally connected with the base frame. The first driving assembly is used to drive the moving assembly to rotate relative to the base frame and to move together with the first sliding member. The carrying assembly is for carrying a human body disposed on the moving assembly.

In one preferred embodiment, the base frame of the present invention has at least one supporting rod and a rail disposed on the supporting rod, and the first sliding member being movably connected with the rail.

In one preferred embodiment, the base frame has at least one supporting rod, the first sliding member being movably connected with the supporting rod.

In another preferred embodiment, the base frame of the present invention has at least one pivot joint fixed on the first sliding member, the moving assembly being pivotally connected with the pivot joint.

In one preferred embodiment, the first driving assembly includes a first cylinder pivotally connected with the base frame and a first piston rod coupled to the first cylinder, one end of the first piston rod being pivotally connected with the first rod.

In another preferred embodiment, the moving assembly includes a second rod parallel to the first rod, the second rod being pivotally connected with the first sliding member.

In one preferred embodiment, the present invention further includes a sliding member and a second driving assembly that are connected to the moving assembly; wherein the carrying assembly includes a back board, a leg board that is pivotally connected with the back board and a foot board pivotally connected with the leg board, the foot board is pivotally connected with the moving assembly, the back board is movably connected with the sliding member via a second sliding member; wherein the second driving assembly includes a second cylinder and a second piston rod coupled to the second cylinder, and one end of the second piston rod is pivotally connected with the back board.

In another preferred embodiment, the present invention further comprises at least one telescopic rod and a second driving assembly that are connected to the moving assembly; wherein the carrying assembly includes a back board, a leg board that is pivotally connected with the back board and a foot board pivotally connected with the leg board, the foot board is pivotally connected with the moving assembly, and one end of the telescopic rod is connected with the back board; wherein the second driving assembly includes a second cylinder and a second piston rod coupled to the second cylinder, one end of the second piston rod is pivotally connected with the back board.

DETAILED DESCRIPTION

Figure 1:
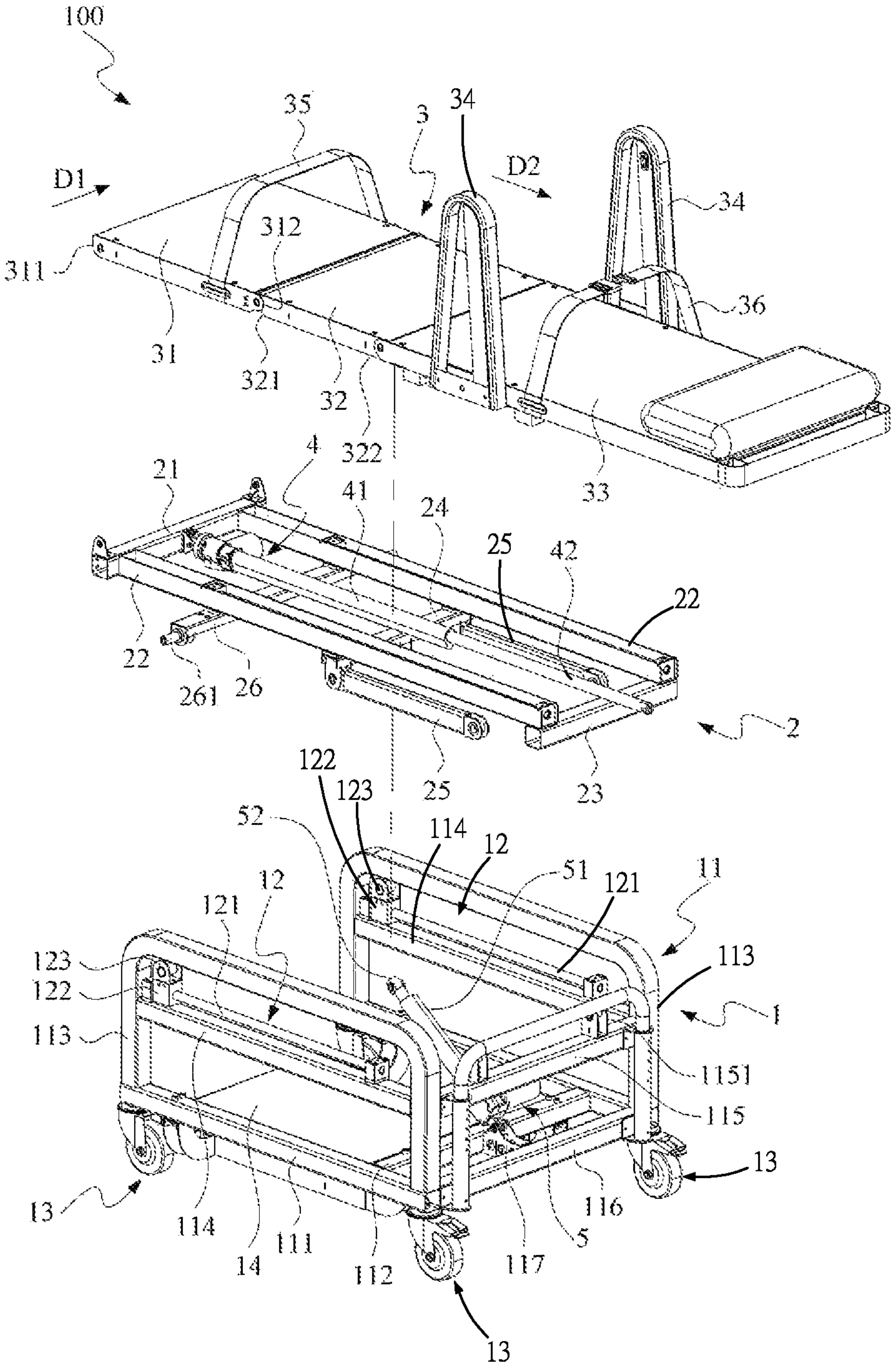
FIGS. 1 and 2 show the exploded perspective view of the first preferred embodiment of the present invention from different angle.
Figure 2:
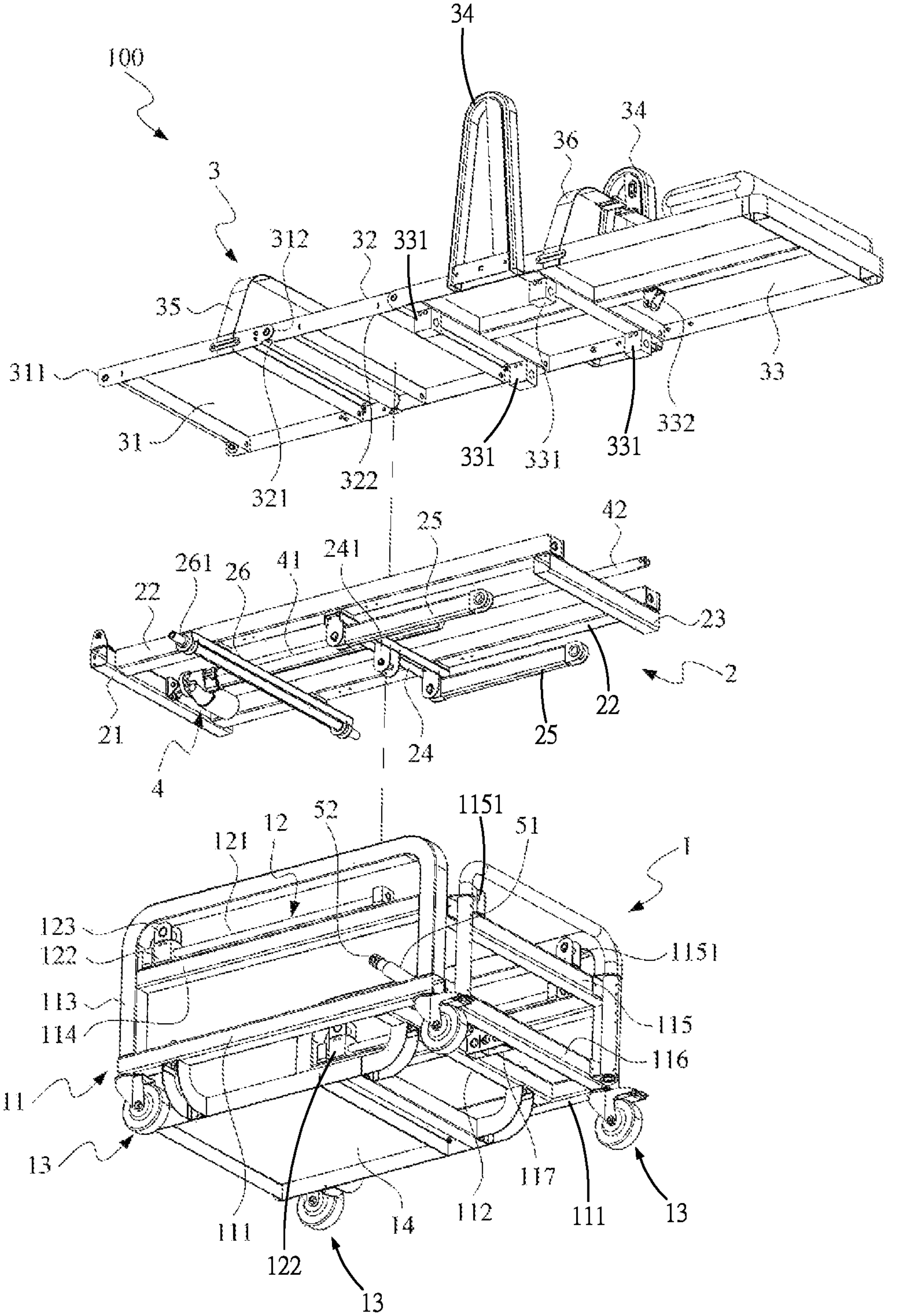
Figure 3:
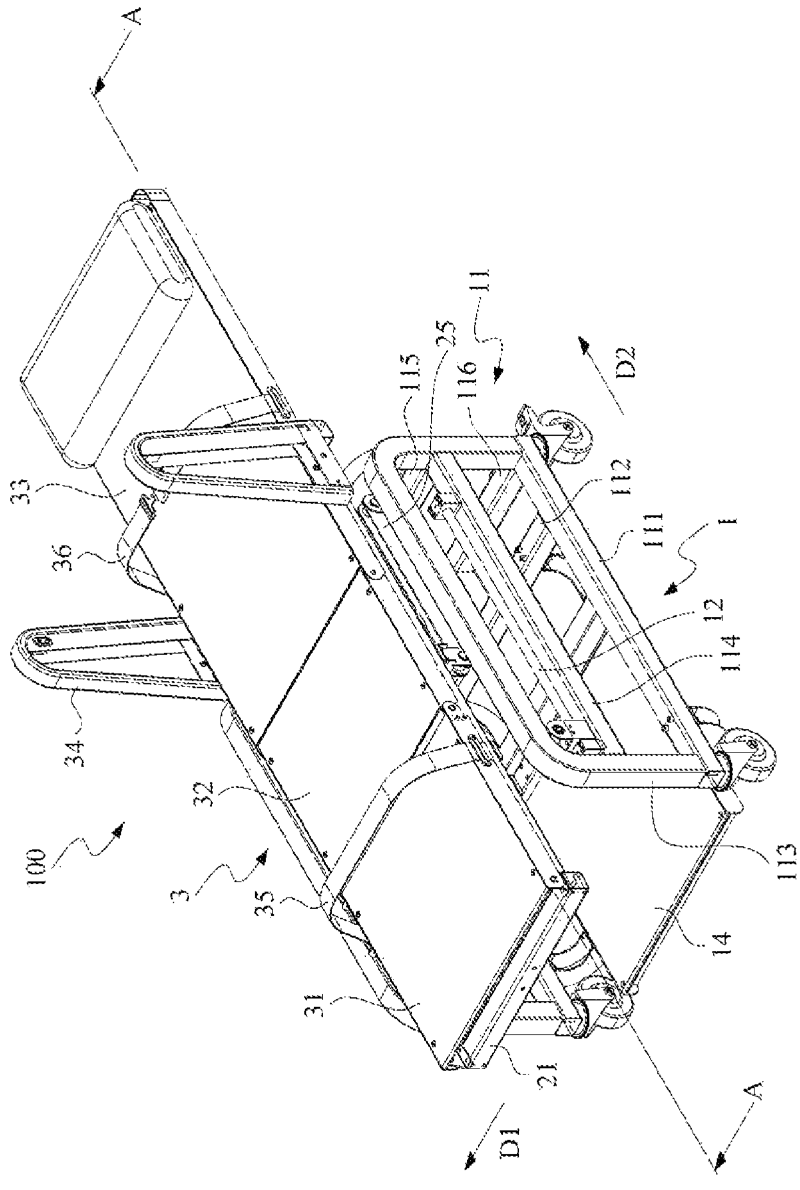
FIG. 3 shows the perspective view of the preferred embodiment of the present invention in unfolded flat mode.

FIGS. 1 to 3 show the first preferred embodiment of the changeable carrying device 100 for human body based on posture changing of present invention, which comprises a base frame 1, a moving assembly 2, a carrying assembly 3, a second driving assembly 4 for driving the carrying assembly 3 to change its shape, and a first driving assembly 5 for driving the moving assembly 2 to change its shape, wherein the carrying assembly 3 could opt out of transformation function, in this case, the second driving assembly 4 can omitted.

The base frame 1 includes a frame structure 11, two sliding assemblies 12, four wheels, and a stepped board 14.

The frame structure 11 includes two bottom frames 111, an inside frame 112, two vertical frames 113, two supporting rods 114, a front frame 115, an outside frame 116, and a pivot joint 117.

The two bottom frames 111 of the frame structure 11 respectively extend along a second direction D2 and spaced apart. The inside frame 112 extends along a first direction D1 which is perpendicular to the second direction D2, and the two ends of the inside frame 112 are respectively connected to the two bottom frames 111.

The two ends of the two vertical frames 113 of the frame structure 11 are respectively fixed to the two ends of the two bottom frames 111. The two supporting rods 114 respectively extend along the second direction D2 and are connected to the two vertical frames 113, wherein in the first preferred embodiment the two vertical frames 113 are in arc shape.

The front frame 115 of the frame structure 11 is disposed between the two vertical frames 113, and fixed to the two vertical frames 113, and the front frame 115 has two pivot joints 1151 that are spaced apart. The outside frame 116 is disposed between the two bottom frames 111, and fixed to the two bottom frames 111, and the outside frame 116 is located beneath the front frame 115. The pivot joint 117 is disposed between the inside frame 112 and the outside frame 16, and the two ends of the pivot joint 117 are respectively affixed to the inside frame 112 and the outside frame 116.

Each of the two sliding assemblies 12 of the base frame 1 has a rail 121, a first sliding member 122 and a pivot joint 123. The rail 121 extends along the second direction D2 and is fixed on the supporting rod 114, the first sliding member 122 is movably disposed on the rail 121. The pivot joint 123 is fixed to the first sliding member 122 so that it could move to and fro along the second direction D2 with the first sliding member 122.

The four wheels 13 of the base frame 1 are disposed at the bottom of the frame structure 11, so that the base frame 1 is portable; wherein, although in the preferred embodiment, the base frame 1 is able to move with the four wheels 13, however, the base frame 1 may be without the wheels 13 and only provides the function of support. The stepped board 14 is fixed to the inside frame 112 and the bottom frame 111.

Figure 4:
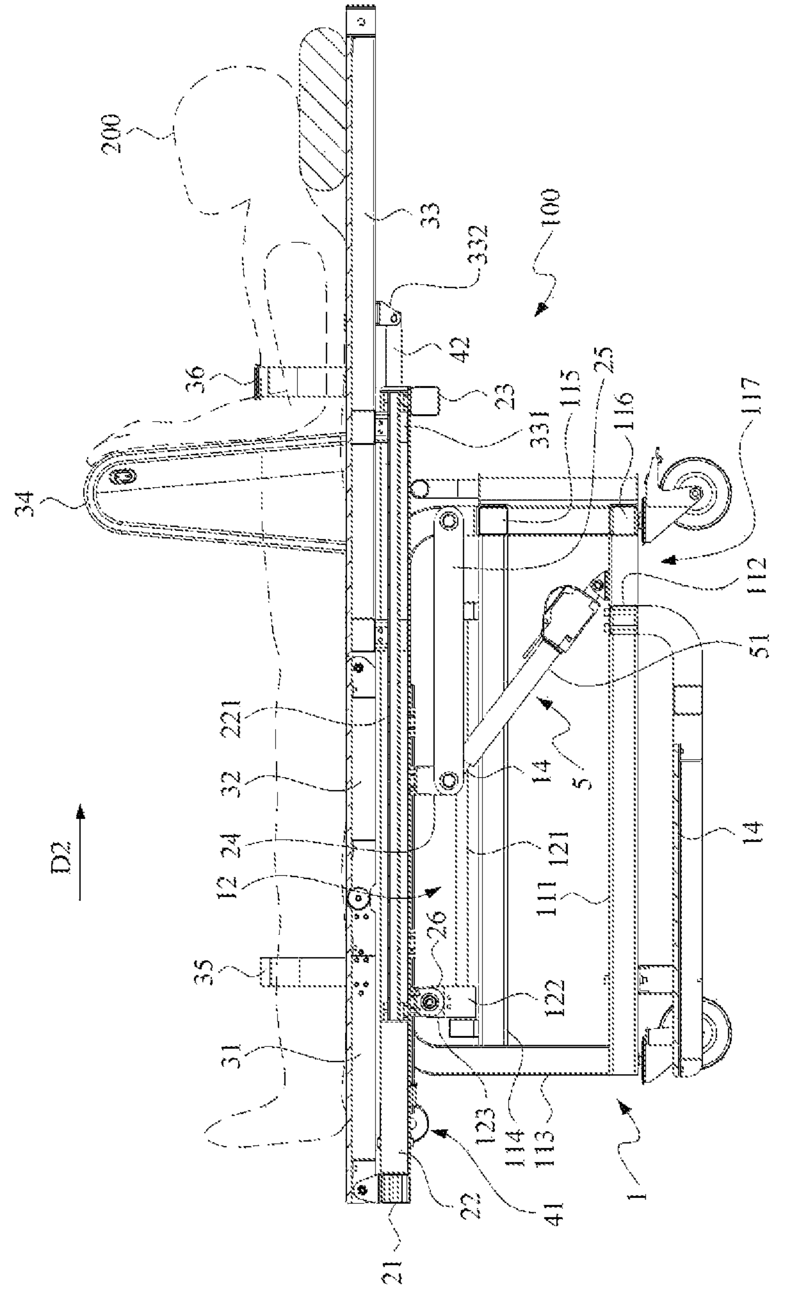
FIG. 4 shows the A-A cross-sectional view of FIG. 3.

The moving assembly 2 includes a rear frame 21, two side frames 22, a front frame 23, a first rod 24, two cranks 25 and a second rod 26. The rear frame 21 extends along the first direction D1. The side frames 22 are connected to both sides of the rear frame 21 respectively, and extend along the second direction D2 respectively, and each of the two side frames 22 has a sliding member 221 that extends along the second direction D2 (as shown in FIG. 4, only one is shown). In the first preferred embodiment, each sliding member 221 is a rail.

The front frame 23 of the moving assembly 2 extends along the first direction D1, and is fixed to an end of the two side frames 22. As shown in FIG. 2, the first rod 24 is respectively connected to the center of the two side frames 22, and the center of the first rod 24 further comprises a pivot joint 241.

The two ends of the two cranks 25 of the moving assembly 2 are pivotally connected to the first rod 24 and the pivot joint 1151 of the front frame 115 of the base frame 1. The second rod 26 is fixed to the two side frames 22, and each two ends of the second rod 26 has a round tube 261, the round tubes 261 are respectively and pivotally connected to the pivot joint 123 of the sliding assembly 12 of the base frame 1. Therefore, when the crank 25 is driven to rotate, or when the first sliding member 122 is driven to slide, the angle of the moving assembly 2 will change relative to the base frame 1. In the first preferred embodiment, the moving assembly 2 is driven to move through the rotation of the crank 25.

The carrying assembly 3 includes a foot board 31, a leg board 32, a back board 33, two armrests 34, a lower fastening belt 35 and an upper fastening belt 36.

The food board 31 has a rear end portion 311 and a front end portion 312 opposite to each other, the rear end portion 311 is pivotally connected to the rear frame 21 of the moving assembly 2. The leg board 32 has a rear end portion 321 and a front end portion 322 opposite to each other, and the rear end portion 321 of the leg board 32 is pivotally connected to the front end portion 312 of the foot board 31. The back board 33 is pivotally connected to the front end portion 322 of the leg board 32, and is movably disposed on the two side frames 22 along the second direction D2. As shown in FIG. 2, the back board 33 has four second sliding members 331 provided at the bottom, and these four second sliding members 331 are respectively disposed on the sliding member 221 of the moving assembly 2 (see FIG. 4), so that the back board 33 could move to and fro along the second direction D2. Furthermore, the center of the back board 33 has a pivot joint 332.

In the first preferred embodiment, the rear end portion 311 of the foot board 31 is pivotally connected to the rear frame 21 of the moving assembly 2, the rear end portion 321 of the leg board 32 is pivotally connected to the front end portion 312 of the foot board 31. Since the back board 33 is movable along the second direction D2, and pivotally connected to the front end portion 322 of the leg board 32, therefore, when the back board 33 is driven to slide, the carrying assembly 3 will be transformed.

The armrests 34 are connected to the two sides of the back board 33, the lower fastening belt 35 is disposed on the foot board 31, and the upper fastening belt 36 is disposed on the back board 33; wherein the lower fastening belt 35 and the upper fastening belt 36 are belts with fastening function.

The second driving assembly 4 includes a second cylinder 41 and a second piston rod 42. The second cylinder 41 is fixed to the rear frame 21, the second piston rod 42 is telescopically disposed in the second cylinder 41, and one end of the second piston rod 42 is pivotally connected to the pivot joint 332 of the back board 33. The second driving assembly 4 is able control the telescopic movement of the second piston rod 42 through the second cylinder 41 to drive the back board 33 to move along the first direction D1.

The first driving assembly 5 comprises a first cylinder 51 and a first piston rod 52. The first cylinder 51 of the first driving assembly 5 is pivotally connected to the pivot joint 117 of the base frame 1, the first piston rod 52 of the first driving assembly 5 is telescopically disposed in the first cylinder 51 of the first driving assembly 5, and one end of the first piston rod 52 of the first driving assembly 5 is pivotally connected to the pivot joint 241 of the first rod 24. Therefore, the first driving assembly 5 is able to control the telescopic movement of the first piston rod 52 through the first cylinder 51 to drive the moving assembly 2 and the carrying assembly to rotate relative to the base frame 1.

Figure 11:
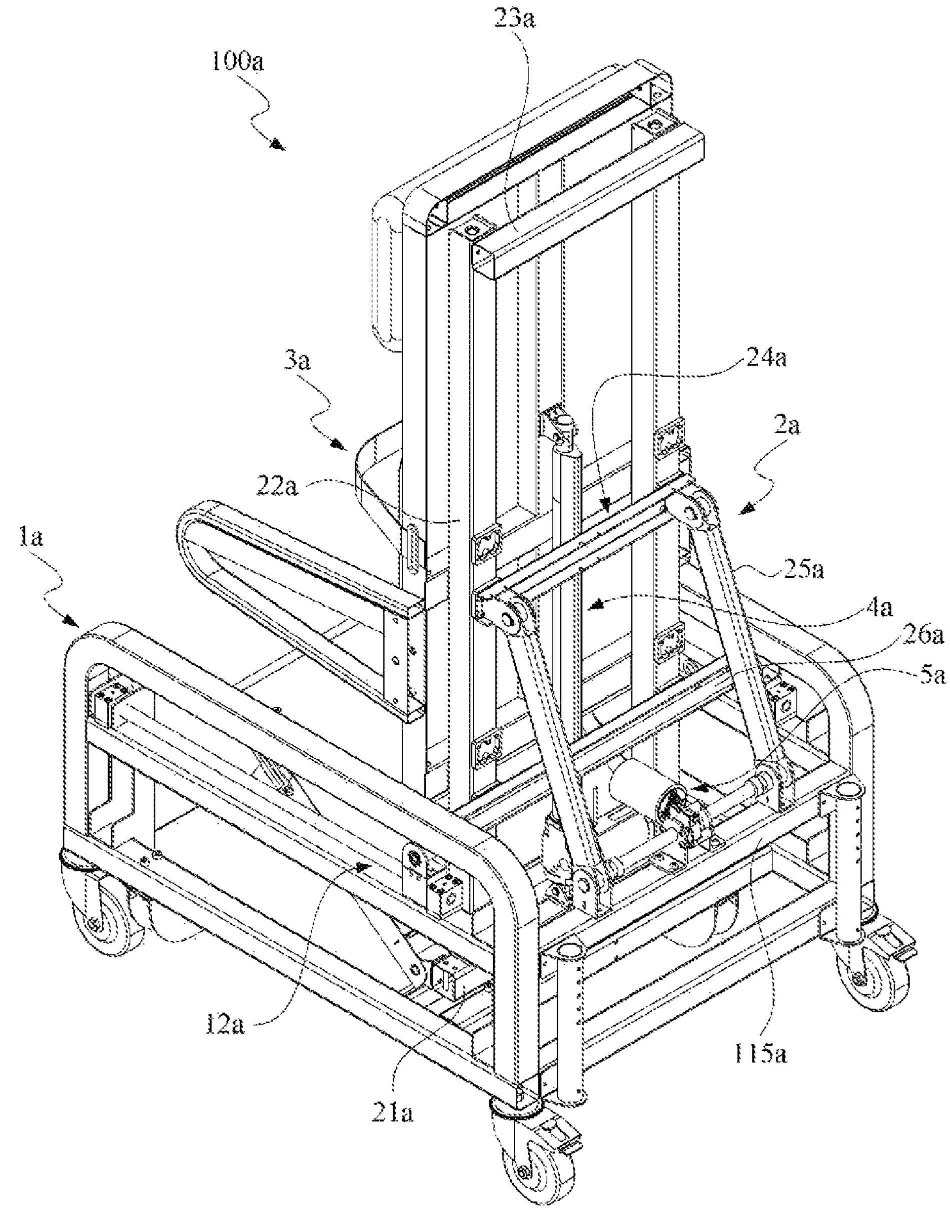
FIG. 11 shows the perspective view of the second preferred embodiment of the present invention.
Figure 12:
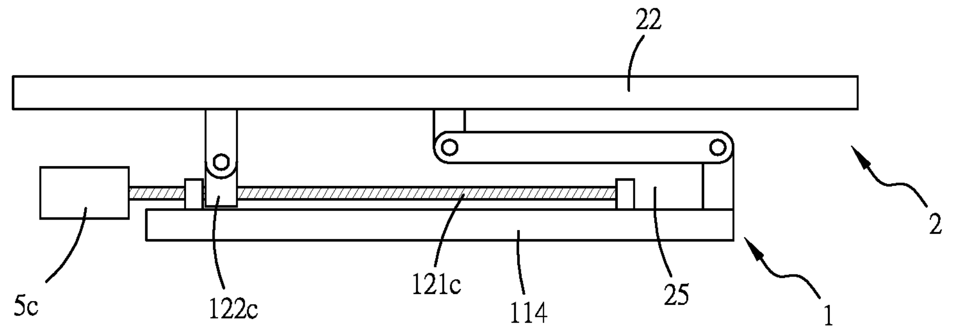
FIGS. 12 and 13 show a selected driving method of the present invention in motion.
Figure 13:
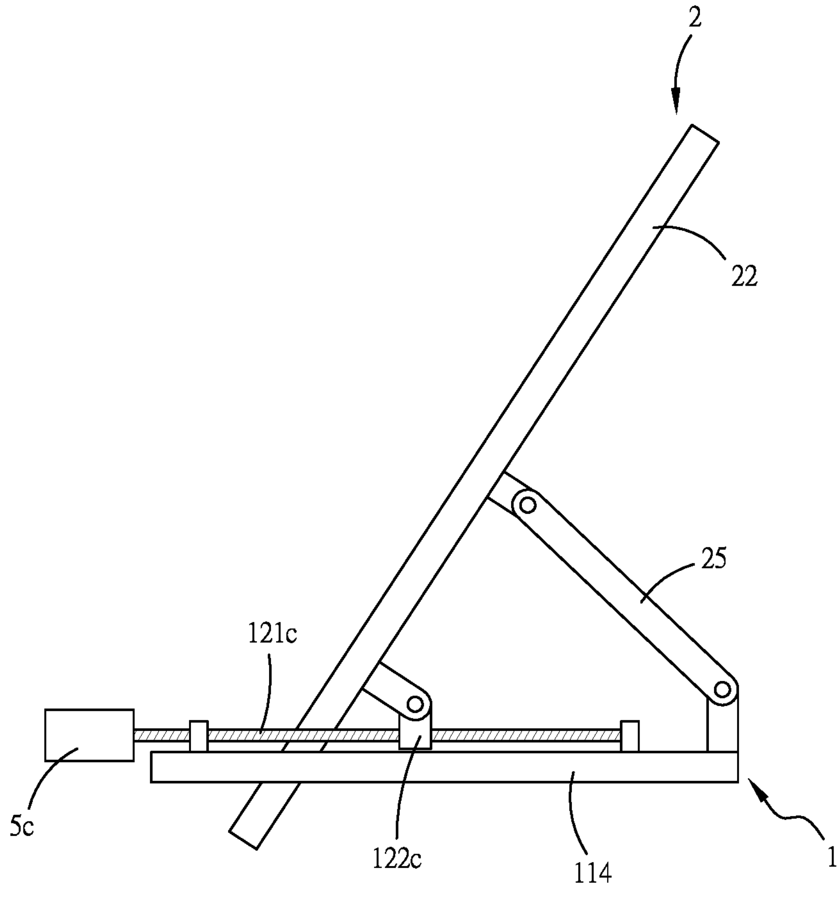
Figure 14:
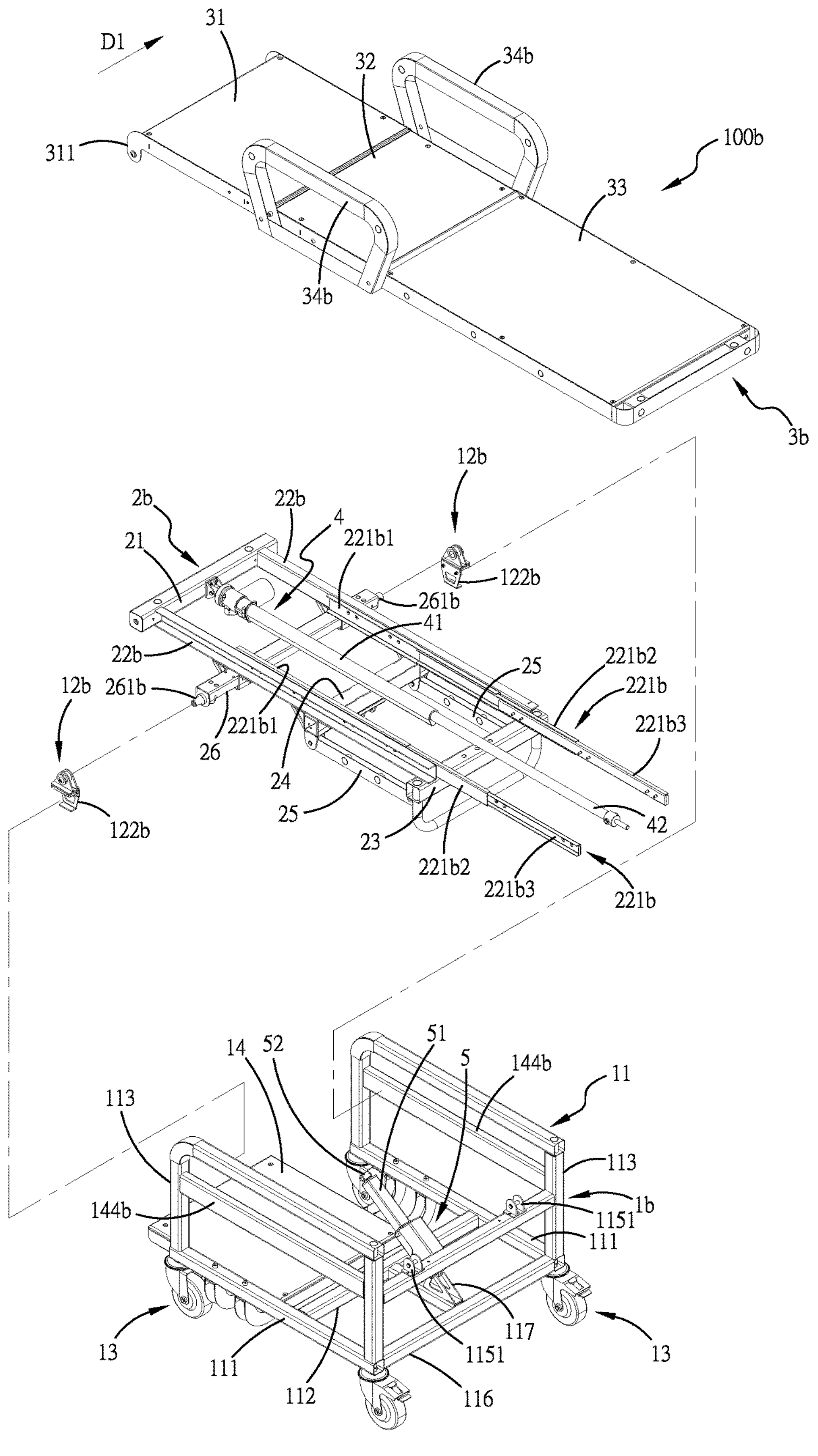
FIGS. 14 and 15 show the exploded view of the third preferred embodiment of the present invention from different angle.

In the present invention, the aforementioned way of using the first driving assembly 5 to drive the moving assembly 2 to rotate relative to the base frame 1 is only one of the driving methods selected by the present invention, the present invention may select other driving method, and not limited to the above. For example, as shown in FIG. 11, by connecting a first driving assembly 5*a* to the pivot point of the crank 25*a*, to enable the first driving assembly 5*a* to drive the crank 25*a* to rotate, and further drives the moving assembly 2 to move relative to the base frame 1. This driving method will be described in detail below. In another example, as shown in FIG. 12, by directly connecting a motor 5*c* to a lead screw 121*c*, to enable the motor 5*c* to drive the lead screw 121*c* to rotate, and thus drives a nut 122*c* to move linearly along the lead screw 121*c*, and further drives the crank 25 to rotate, so that the moving assembly 2 will rotate relative to the base frame 1, as shown in FIG. 13. In the aforementioned driving method, the lead screw 121*c* and the nut 122*c* screwed thereon respectively replace the above-described rail 121 and the first sliding member 122.

As described above, the carrying device 100 of the present invention mainly pivots the crank 25 of the moving assembly 2 to the pivot joint 1151 of the base frame 1, and pivots the round tube 261 to the pivot joint 123 of the base frame 1, so that when the first driving assembly 5 controls the crank 25 to rotate relative to the base frame 1, it will enable the moving assembly 2 to rotate and move.

In detail, when the first driving assembly 5 uses the movement of the first piston rod 52 to change the position of the first rod 24, because the first rod 24 is pivotally connected to the crank 25, and the round tube 261 is pivotally connected to the pivot joint 123, therefore, the side frame 22 of the moving assembly 2 will rotate relative to the base frame 1 with the round tube 261 as the axis of rotation, and the round tube 261 will move along the second direction D2 along the rail 121, and cause the angle of the side frame 22 to change from being horizontal to the supporting rod 114 to being vertical to the supporting rod 114, and the round tube 261 along with the aforementioned displacement as a result of the change of angle can minimize the overall effect of the center of the gravity change resulted from the rotation of the side frame 22.

Figure 7:
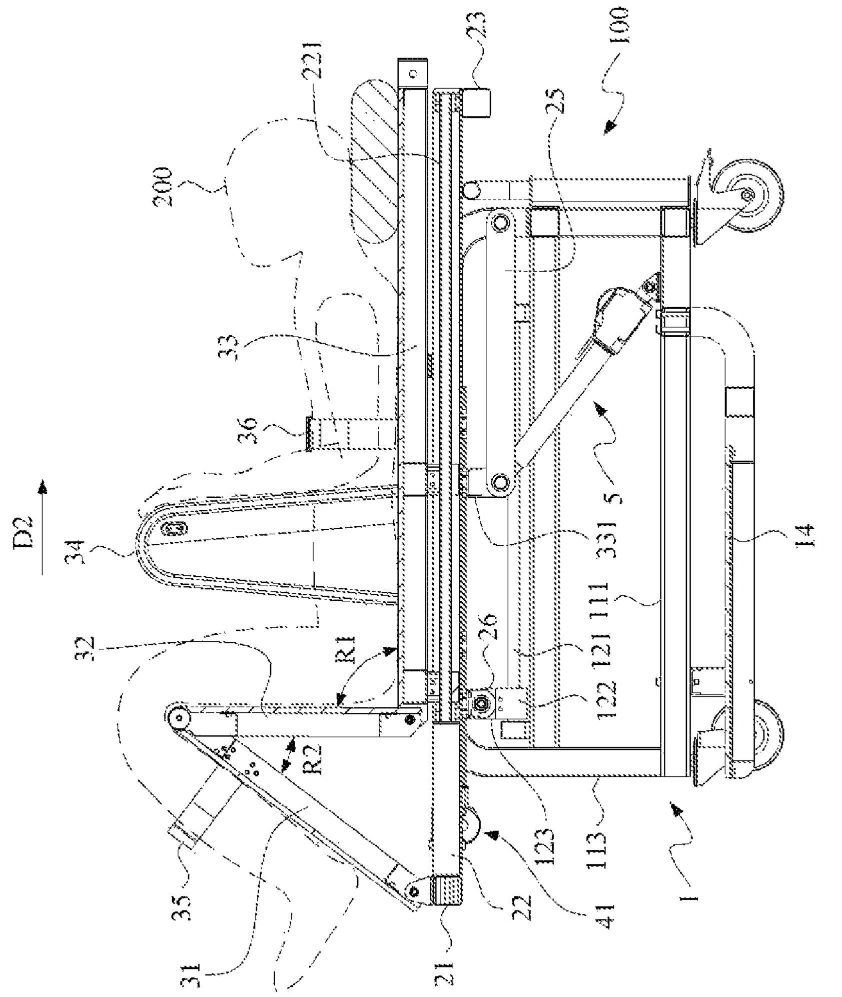
FIG. 7 shows the cross-sectional view of the first preferred embodiment of the present invention in a lie-down knee up mode.

Moreover, since the carrying device 100 of the present invention further includes the aforementioned foot board 31, leg board 32 and back board 33, therefore, the position of the back board 33 can be changed by moving the second sliding member 331 of the second driving assembly 4, and thus enable the carrying assembly 3 to switch between the unfolded flat mode as shown in FIGS. 3 and 4 to a lie-down knee up mode as shown in FIG. 7.

In the first preferred embodiment, the second cylinder 41 and the first cylinder 51 are both electric cylinders, they are driven by electricity to drive second piston rod 42 or the first piston rod 52 to contract and expand, however, the other embodiments are not limited to this as the second cylinder 41 and the first cylinder 51 can be replaced with hand-operated cylinders which allow the second piston rod 42 or the first piston rod 52 to contract and expand through manual operation; furthermore, in addition to the hand-operated cylinder, the second cylinder 41 and the first cylinder 51 can also be replaced with cylinders driven by various power sources, such as hydraulic cylinders or pneumatic cylinders.

Figure 5:
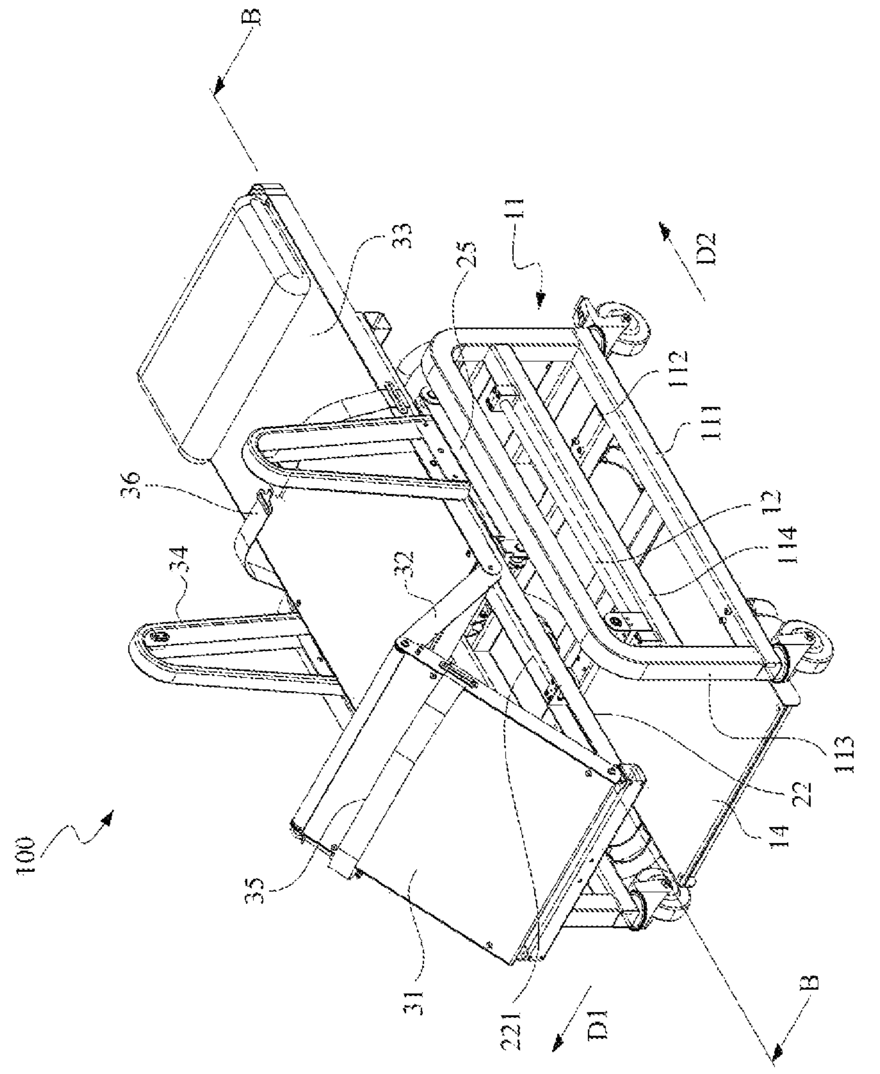
FIG. 5 shows the perspective view of the first preferred embodiment of the present invention when the back plate 33 moves away from the second direction D2.
Figure 6:
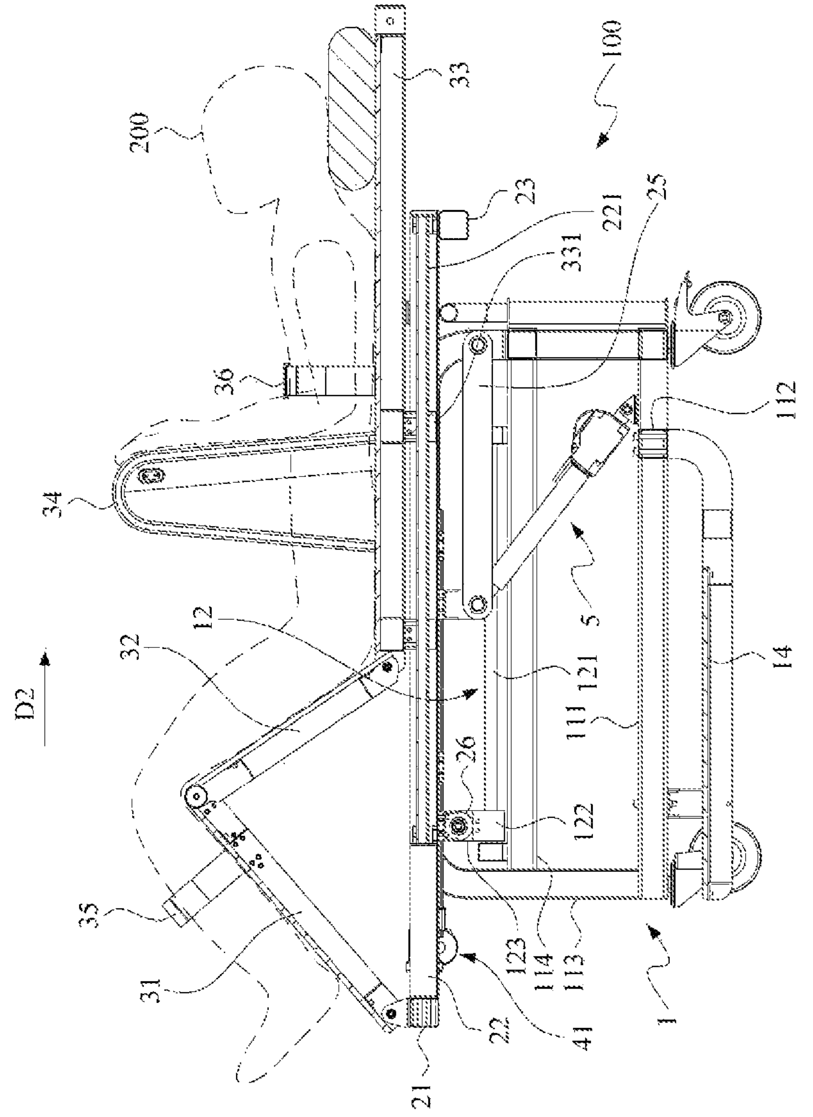
FIG. 6 shows the B-B cross-sectional view of FIG. 5.

As shown in FIGS. 1 to 6, when the carrying device 100 of the present invention is in the unfolded flat mode, the upper fastening belt can be used to strap the body of a user 200 to the back board 33. Subsequently, the user 200 can retract the second piston rod 42 into the second cylinder 41 by controlling the second driving assembly 4, at this time, through the guidance of the second sliding member 331 of the back board 33, the back board 33 is driven to move away from the second direction D2; because the rear end portion 311 of the foot board 31 is pivotally connected to the rear frame 21 of the moving assembly 2, therefore, the movement of the back board 33 will drive the leg board 32 to bend relative to the foot board 31 and the back board 33, as shown in FIGS. 5 and 6.

As shown in FIG. 7, when the back board 33 is driven by the second piston rod 42 to move away from the second direction D2 to an end of the sliding member 221, the leg board 32 is at a first angle R1 of the back board 33, and the leg board 32 is at a second angle R2 of the foot board 31, wherein the second angle R2 is less than the first angle R1. The first angle R1 is between 80 degrees to 100 degrees, the second angle R2 is between 30 degrees to 60 degrees. In FIG. 7, the first angle R1 and the second angle R2 are 90 degrees and 30 degrees respectively.

Figure 8:
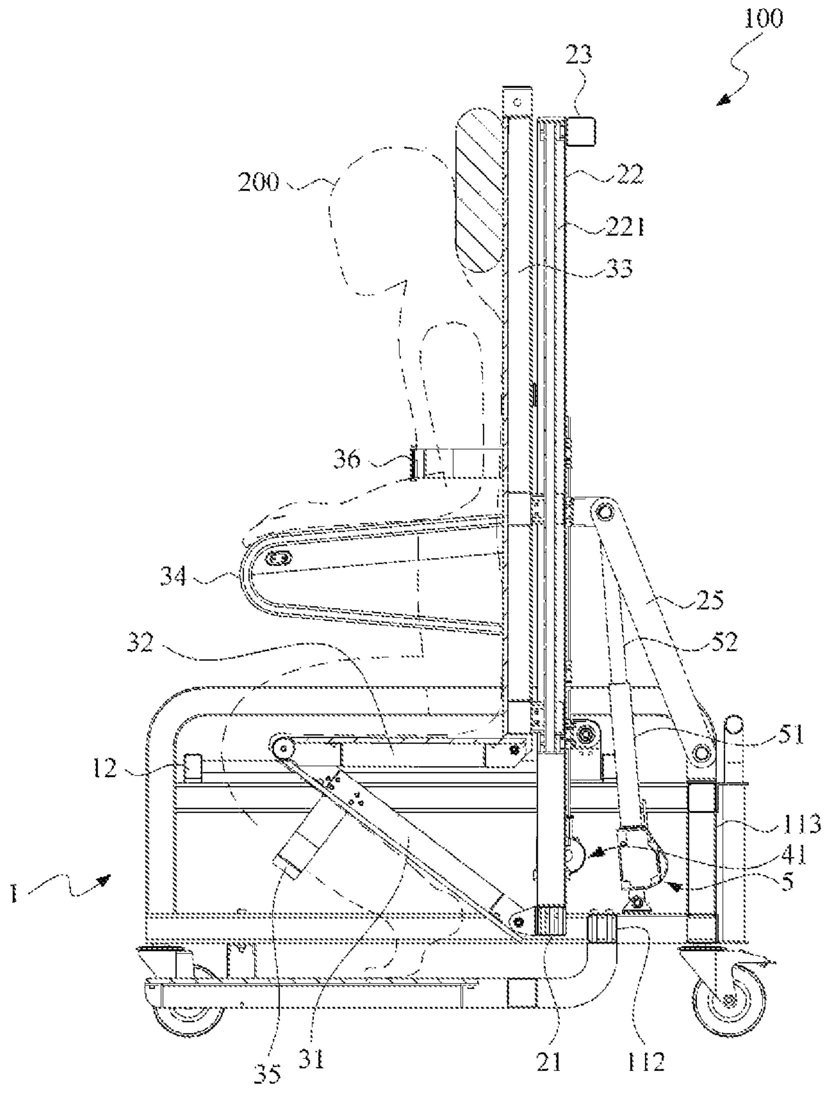
FIG. 8 shows the cross-sectional view of the first preferred embodiment of the present invention in a kneel upright mode.
Figure 9:
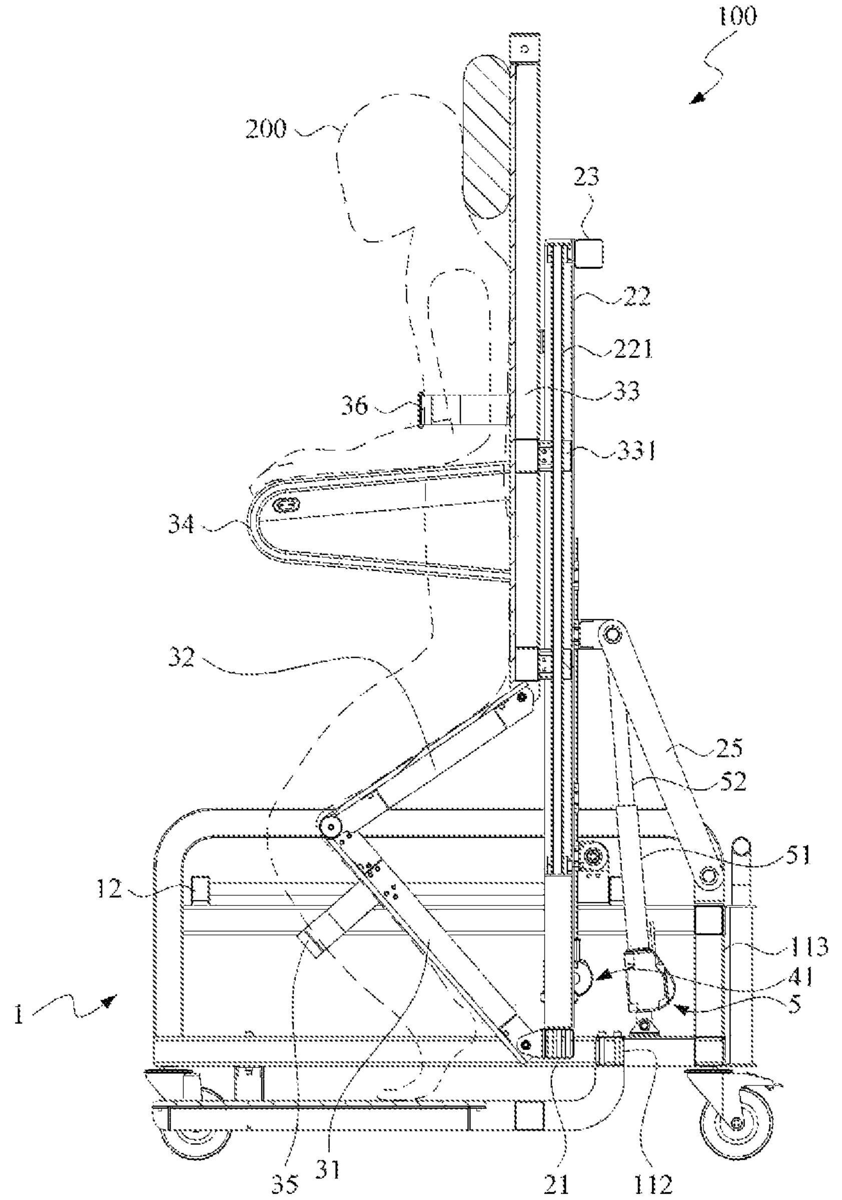
FIG. 9 shows the cross-sectional view illustrating the first preferred embodiment of the present invention converting from a kneel upright mode to a standing upright mode.
Figure 10:
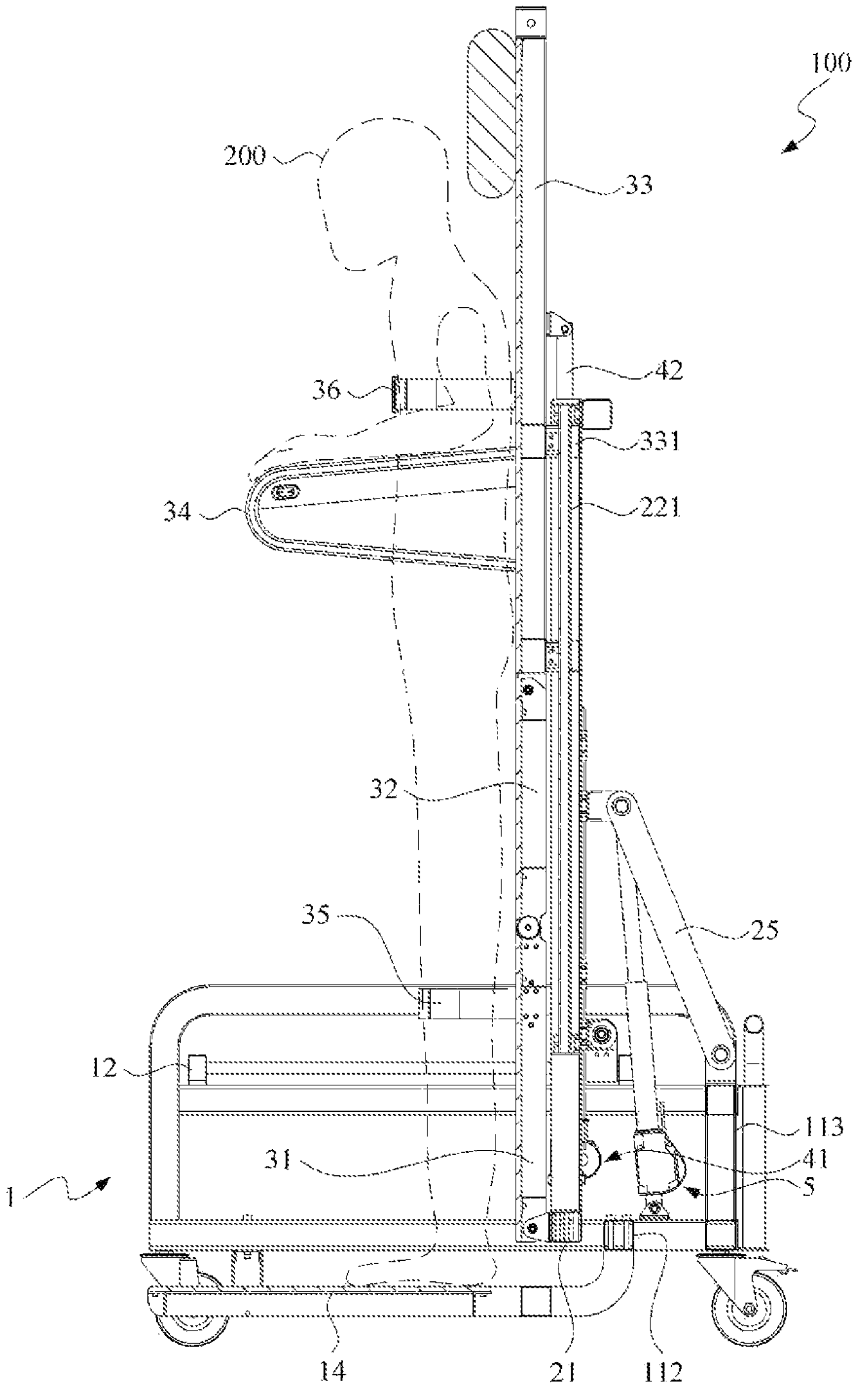
FIG. 10 shows the cross-sectional view of the first preferred embodiment of the present invention in a standing upright mode.

When the user 200 uses the second driving assembly 4 to drive the back board 33 to switch the carrying device 100 of the present invention from the unfolded flat mode to the lie-down knee up mode, the user could further switch the carrying device 100 from the lie-down knee up mode to a kneel upright mode as shown in FIG. 8 by using the first driving assembly 5 to drive the moving assembly 2 and the carrying assembly 3 to rotate, at this time, the user could further control the second driving assembly 4 to push the second piston rod 42 outward, so that the back board 33 returns to the original position, at this time, the carrying device 100 will switch from the kneel upright mode to a standing upright mode as shown in FIG. 10.

As described above, because the body of the user 200 is strapped to the back board by the upper fastening belt, therefore, carrying assembly 3 will switch the user 200 from the lie-down knee up mode to a standing mode, during this change of position, the upper fastening belt 36 not only prevents the upper body of the user 200 from being lopsided, but also allow the user 200 to grasp and secure the upper body with the two armrests 34, and the stepped board 14 for the user 200 to step on, furthermore, the lower fastening belt 35 provides the user 200 knees and feet support until standing posture is completed. In this way, the user 200 can use the carrying device 100 to easily switch from a lying position to a standing position which effectively improves the convenience of the user 200.

FIG. 11 shows the second preferred embodiment of the present invention, wherein it discloses a changeable carrying device 100*a* for human body based on posture changing, that which is similar to the aforementioned carrying device 100, also comprises a base frame 1*a*, a moving assembly 2*a*, a carrying assembly 3*a*, a second driving assembly 4*a* and a first driving assembly 5*a*.

As described above, the difference between the carrying device 100*a* and 100 is that the first driving assembly of the carrying device 100*a* is disposed on the front fame 115*a* of the base frame 1*a*, and connected to an end of the two cranks 25*a*, thereby, the first driving assembly 5*a* can provide torque to drive the two cranks 25*a* to rotate relative to the base frame 1*a*, further driving the first rod 24*a* connected thereon to move. Since the first rod 24*a* is connected to the side frame 22*a*, and the side frame 22*a* is movably connected to the sliding assembly 12*a* through second rod 26*a*, hence, when the first driving assembly 1 drives the two cranks 25*a* to rotate relative to the base frame 1*a*, the moving assembly 2*a* will drive the carrying assembly 3*a* to rotate to stand or lie down.

In addition, in the second preferred embodiment, the cylinder of the second driving assembly 4*a* (not shown) is an electric cylinder which uses power to drive the piston rod (not shown), but the second driving assembly 4*a* can be replaced with a hand-operated cylinder, a hydraulic cylinder or pneumatic cylinder. On the other hand, the first driving assembly 5*a* of the second preferred embodiment is a motor driven device which uses power to drive a motor to drive the two cranks 25*a* to rotate relative to the base frame 1*a*, however, the first driving assembly 5*a* can be a hand-operated cylinder, a hydraulic cylinder or a pneumatic cylinder.

Figure 15:
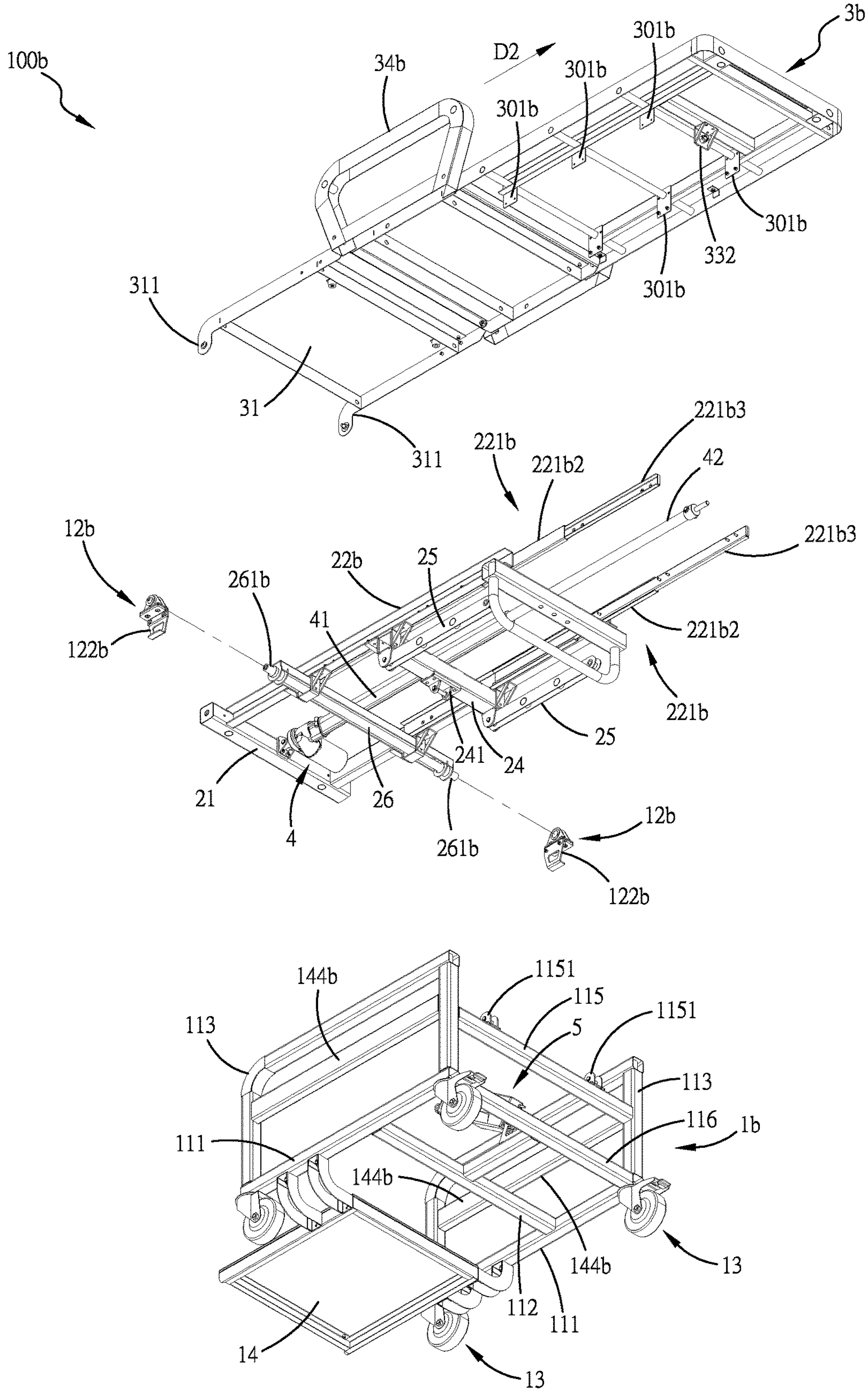
Figure 17:
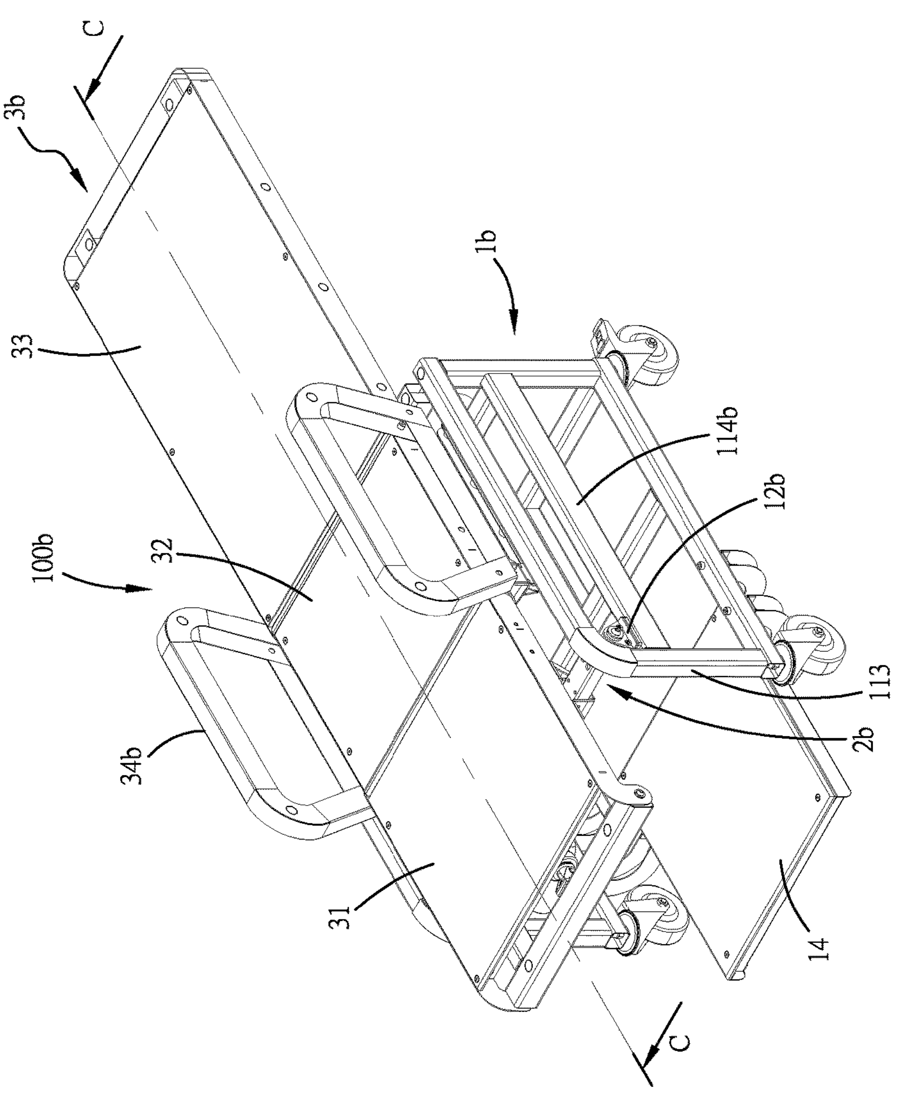
FIG. 17 shows the perspective and cross-sectional view of the third preferred embodiment of the present invention in an unfolded flat mode.

FIGS. 14 to 17 shows the third preferred embodiment of the present invention, wherein it discloses a changeable carrying device 100*b* for human body based on posture changing, that which is similar to the aforementioned first preferred embodiment, the main difference is that the third preferred embodiment adopts the two retractable sliding members 221*b* to replace the above-mentioned sliding member 221 of the moving assembly 2 and the second sliding member 331 of the back board 33. In more detail, each of the sliding members 221*b* of the third preferred embodiment is a retractable multi-section telescopic rod, and the first part 221*b*1 of each sliding member 221*b* is respectively fixed to a side frame 22*b* of the moving assembly 2*b*, a second part 221*b*2 of each sliding member 221*b* is attached to the first part 221*b*1 and is able to slide relative to the first part 221*b*1, a third part 221*b*3 of the sliding member 221*b* is attached to the second part 221*b*2 and is able to slide relative to the second part 221*b*2, and each third part 221*b*3 is connected to the back board 33 of a carrying assembly 3*b*. As shown in FIG. 15, in the third preferred embodiment, the back board 33 has two rows and a total of 16 connecting pieces 301*b*, the three connecting pieces 301*b* in each row are spaced apart along the second direction D2 and connected to the third part 221*b*3.

Figure 16:
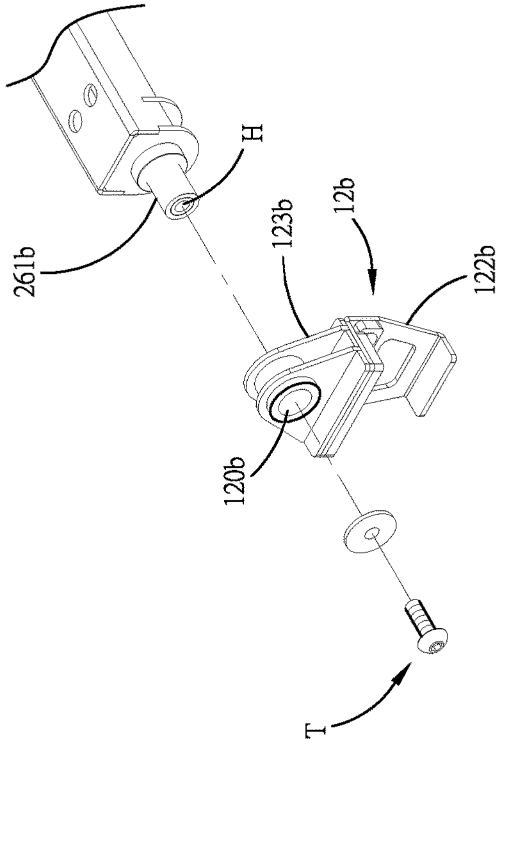
FIG. 16 shows the exploded view of the sliding assembly 12*b* of the third preferred embodiment of the present invention.
Figure 18:
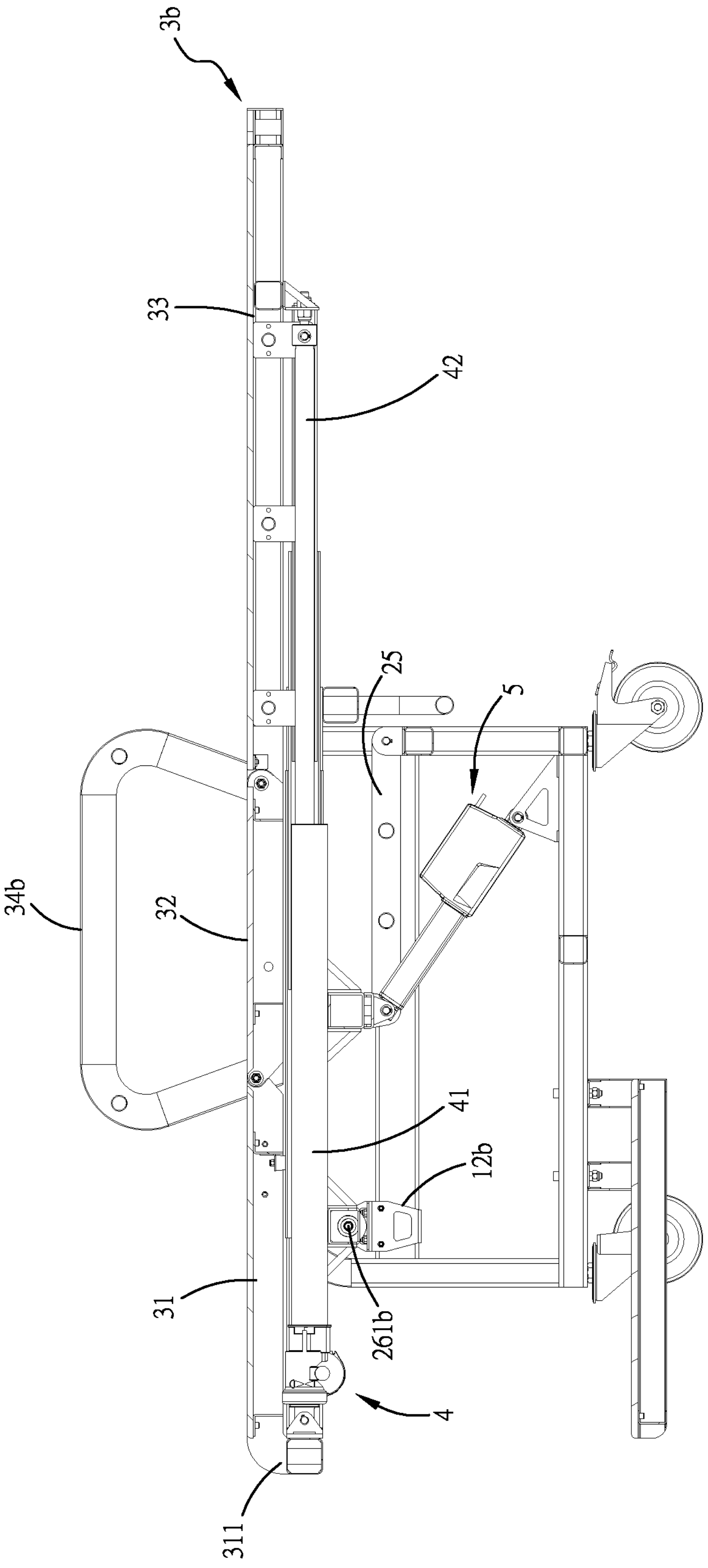
FIG. 18 shows the C-C cross-sectional view of FIG. 17.
Figure 19:
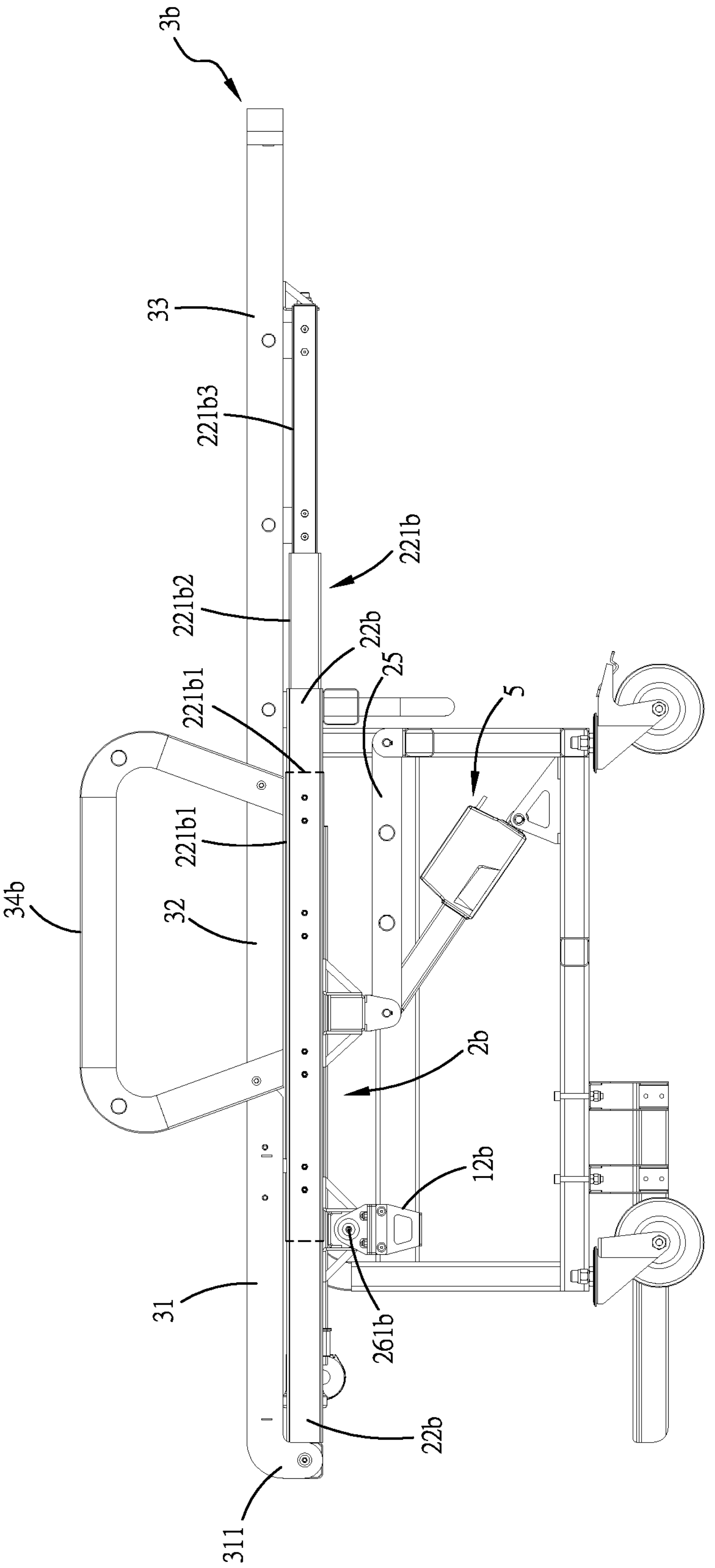
FIG. 19 shows the side view of FIG. 17 (reference nos. 113, 12*b* and 114*b* on the right are omitted).

Another difference is that the third preferred embodiment uses two sliding assemblies 12*b* to replace the sliding assembly 12 of the base frame 1. In particular, a first sliding member 122*b* of each of the sliding assembly 12*b* is respectively attached to the two supporting rods 144*b* of the base frame 1*b*, so that the two sliding assemblies 12*b* can slide along the two supporting rods 144*b*. Moreover, a pivot joint 123*b* of each of the sliding assembly 12*b* is not only fixed to each of the first sliding member 122*b*, but also pivotally connected to the two round tubes 261*b* of the moving assembly 2*b*. FIG. 16 shows each round tube 261*b* passing through a round hole 120*b* on each pivot joint 123*b*, and screwed to a hole H of the round tube 261*b* through a bolt, wherein the round tube 261*b* is able to rotate within the round hole 120*b*.

Furthermore, the two armrests 34*b* of the third preferred embodiment are located on the two sides of the leg board, this is different from the two armrests 34 in the first preferred embodiment where they are located on the two sides of the back board 33, and their shapes are different. As for the other components in the third preferred embodiment, since they mostly the same or similar to the corresponding components of the aforementioned first preferred embodiment, there is no need to elaborate, and as such, the reference numbers used in FIGS. 14 to 17 are derived from FIGS. 1 to 3.

Figure 20:
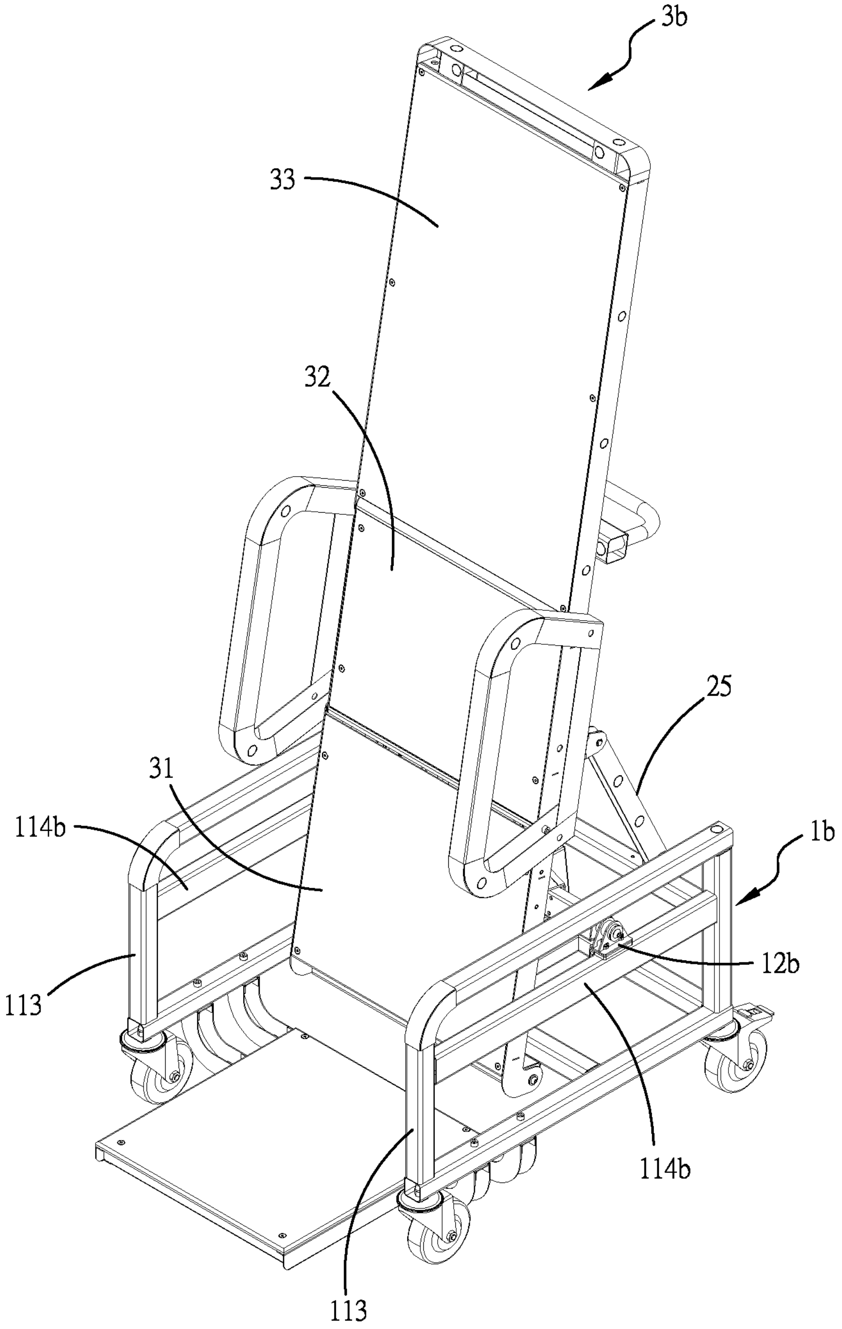
FIG. 20 shows the perspective view of the third preferred embodiment of the present invention in a standing upright mode.
Figure 21:
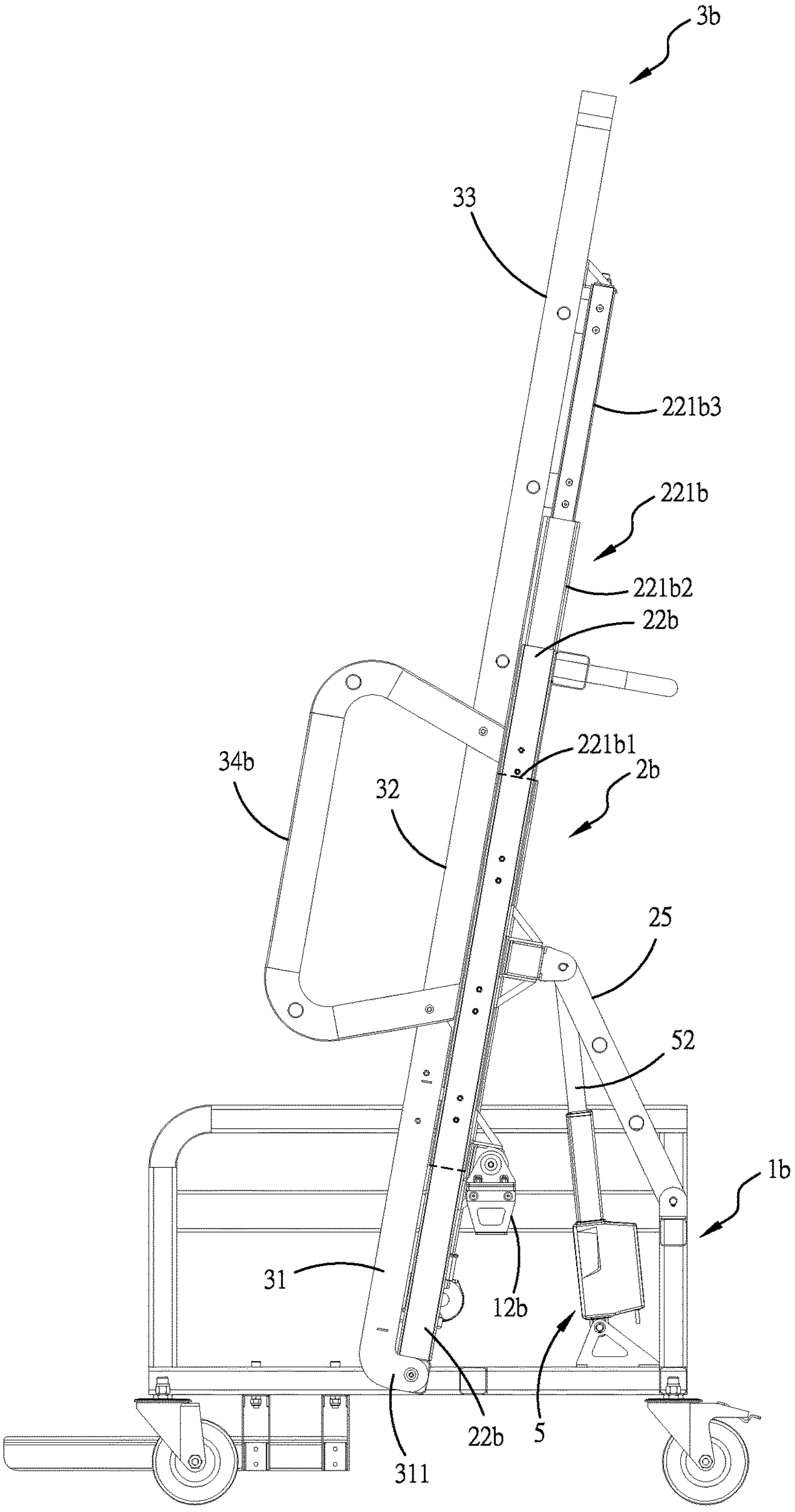
FIG. 21 shows the side view of FIG. 20 (reference nos. 113, 12*b* and 114*b* on the right are omitted).
Figure 22:
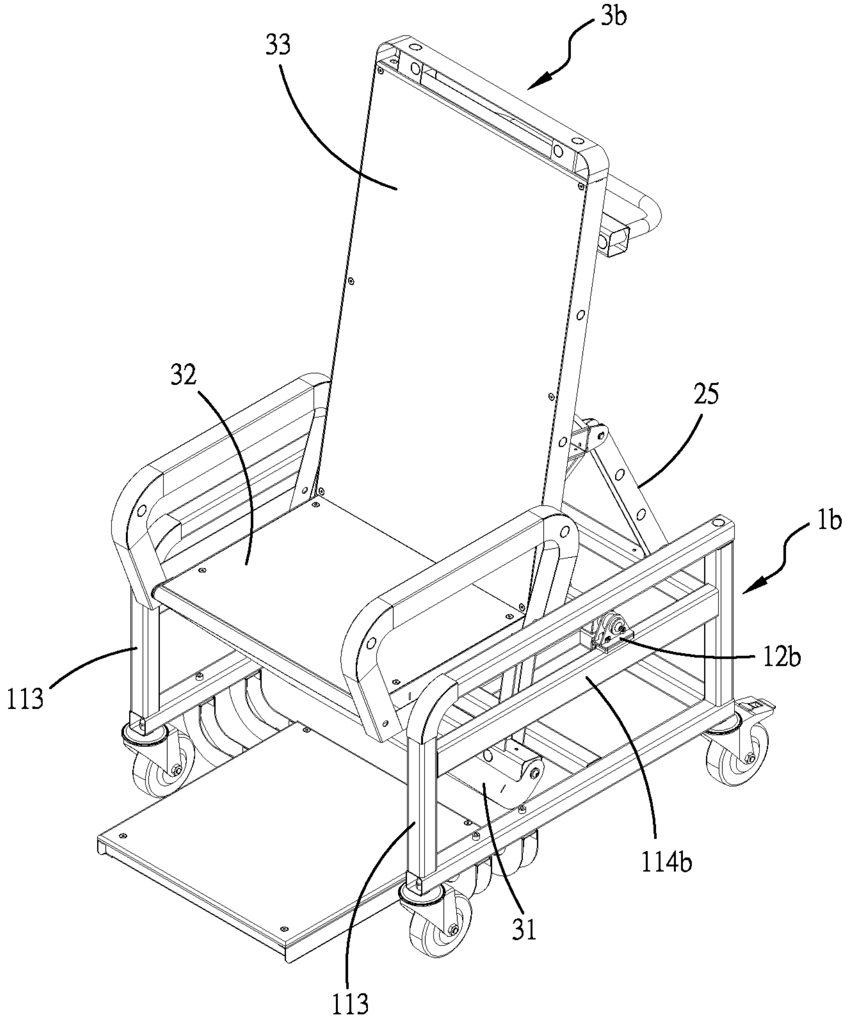
FIG. 22 shows the perspective view of the third preferred embodiment of the present invention being converted into a chair.
Figure 23:
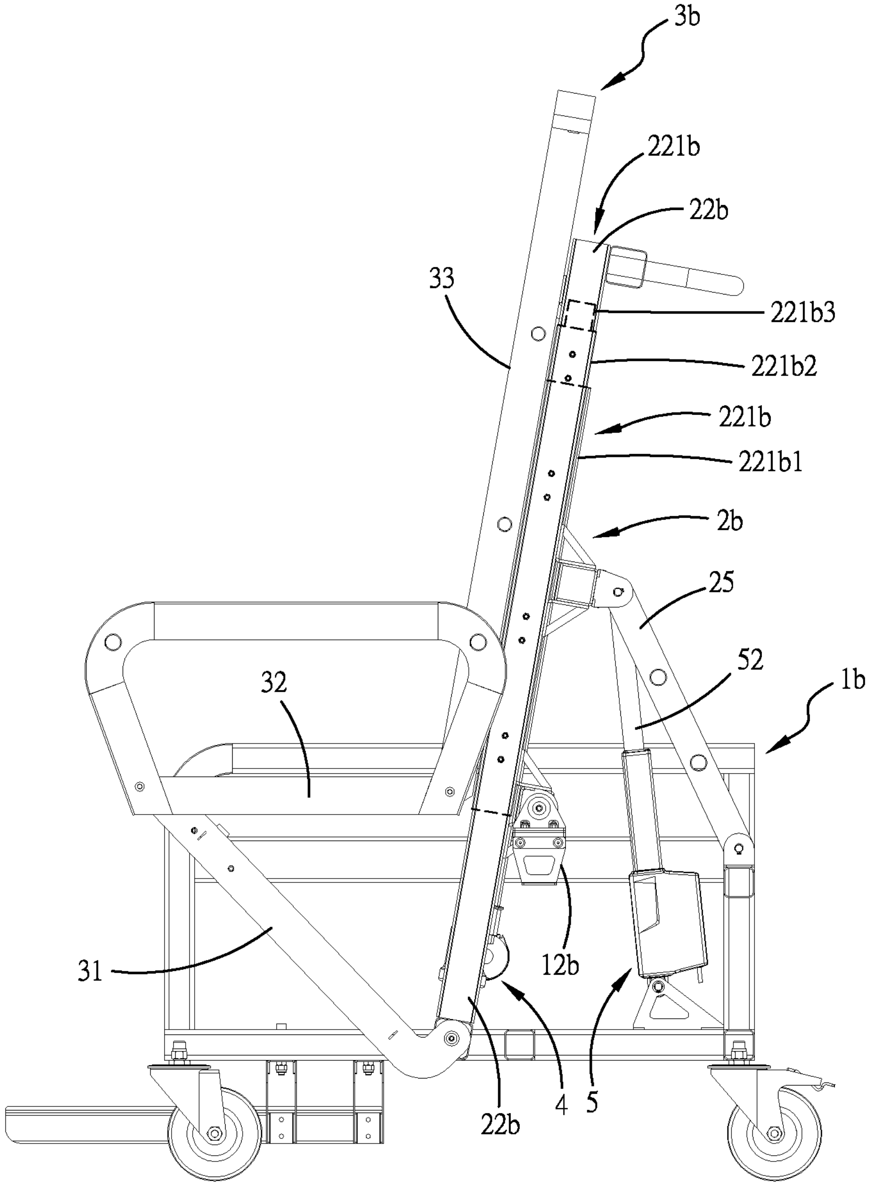
FIG. 23 shows the side view of FIG. 22 (reference nos. 113, 12*b* and 114*b* on the right are omitted).

As seen in FIGS. 17 to 21, when the first driving assembly 5 pushes the moving assembly 2*b* upwards, and driven by the two cranks 25, the moving assembly 2*b* that was originally in a horizontal position is turned to a vertical position through the rotation of the round tube 261*b* as its axis, this is different from FIG. 10 wherein the moving assembly 2*b* is slightly inclined rather than standing upright. Meanwhile, as shown in FIGS. 20 and 21, the moving assembly 2*b* also moves toward the interior of the base frame 1*b* for a certain distance along with the two sliding assemblies 12*b*, the same goes for the carrying assembly 3*b* disposed on the moving assembly 2*b*. In contrast, when the first driving assembly 5 pulls the moving assembly 2*b* downward, the moving assembly 2*b* that was in the vertical position will return to the original horizontal position. Furthermore, the rotation angle of the moving assembly 2*b* can be adjusted by controlling the extending length of the first piston rod 52 of the first driving assembly 5, thereby determining the inclination angle of the moving assembly 2*b*.

As seen in FIGS. 20 to 23, when the second piston rod 42 of the second driving assembly 4 is retracted, it will driving the third part 221*b*3 of the sliding assembly 12*b* to retract to the second part 221*b*2, and the second part 221*b*2 retracts to the first part 221*b*1, and thereby drives the back board 33 to move downward, and the downward movement of the back board 33 will push the leg board 32 that is pivotally connected to it, and causing the back board 33, the leg board 32 and the foot board 31 that are pivotally connected to each other to bend and form a chair.

As the described and shown in the above-mentioned embodiments, the present invention mainly utilizes the aforementioned base frame and sliding block, the moving assembly and the front frame and cranks, and the first driving assembly, so that the carrying assembly disposed on the moving assembly is able to rotate stably, and allow the user of the carrying assembly to easily switch from lying down position to a standing position or a sitting position, or vice verse, thus effectively improves the convenience of the user

What is claimed is:

1. A changeable carrying device for human body comprising:

a base frame with a first sliding member capable of moving straight;

a moving assembly pivotally connected with the first sliding member, the moving assembly having a first rod and a crank with an end pivotally connected with the first rod and with an opposite end pivotally connected with the base frame;

a first driving assembly for providing power, the power driving the moving assembly to rotate relative to the base frame and to move together with the first sliding member; and a carrying assembly for carrying a human body disposed on the moving assembly; wherein the carrying assembly includes a back board, a leg board pivotally connected with the back board and a foot board pivotally connected with the leg board, the foot board being pivotally connected with the moving assembly;

wherein a telescopic rod and a second driving assembly are connected to the moving assembly, one end of the telescopic rod being connected with the back board; wherein the second driving assembly includes a second cylinder and a second piston rod coupled to the second cylinder, one end of the second piston rod being pivotally connected with the back board.

2. The changeable carrying device for human body as recited in claim 1, wherein the base frame includes a supporting rod, the first sliding member being movably connected with the supporting rod.

3. The changeable carrying device for human body as recited in claim 2, wherein the base frame includes a pivot joint fixed on the first sliding member, the moving assembly being pivotally connected with the pivot joint.

4. The changeable carrying device for human body as recited in claim 1, wherein the first driving assembly includes a first cylinder pivotally connected with the base frame and a first piston rod coupled to the first cylinder, one end of the first piston rod being pivotally connected with the first rod.

5. The changeable carrying device for human body as recited in claim 1, wherein the moving assembly includes a second rod parallel to the first rod, the second rod being pivotally connected with the first sliding member.

6. The changeable carrying device for human body as recited in claim 1, wherein the base frame includes a pivot joint fixed on the first sliding member while the moving assembly includes a second rod pivotally connected with the pivot joint.

7. The changeable carrying device for human body as recited in claim 6, wherein the base frame includes a rail, the first sliding member being movably connected with the rail.

8. The changeable carrying device for human body as recited in claim 1, wherein the base frame includes a rail, the first sliding member being movably connected with the rail.

* * * * *